Figure 8:
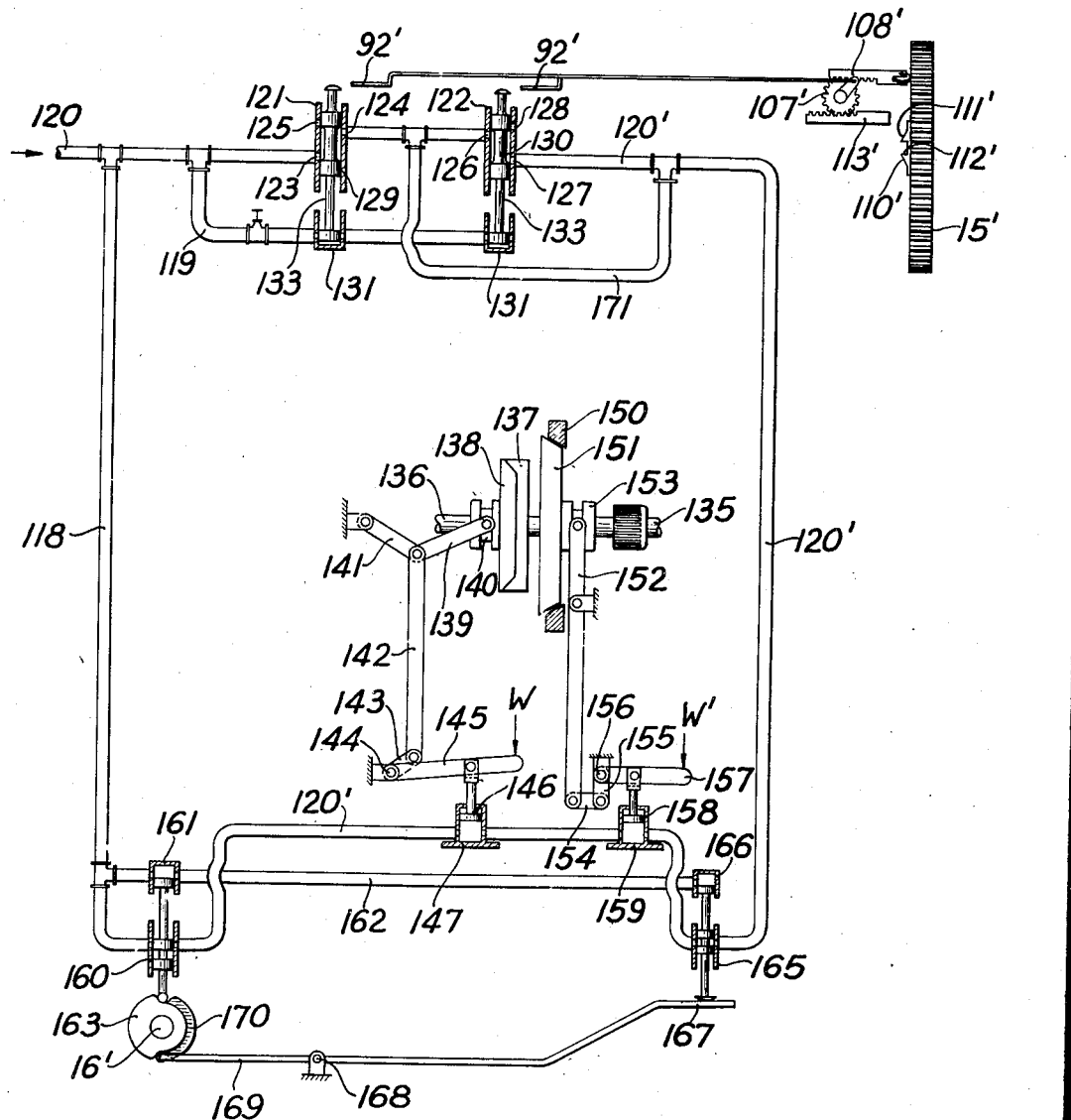

Aug. 13, 1940.   H. G. DEWEY   2,210,886
SAFETY CONTROL FOR SQUARE CUTTERS
Filed March 4, 1938   4 Sheets-Sheet 1
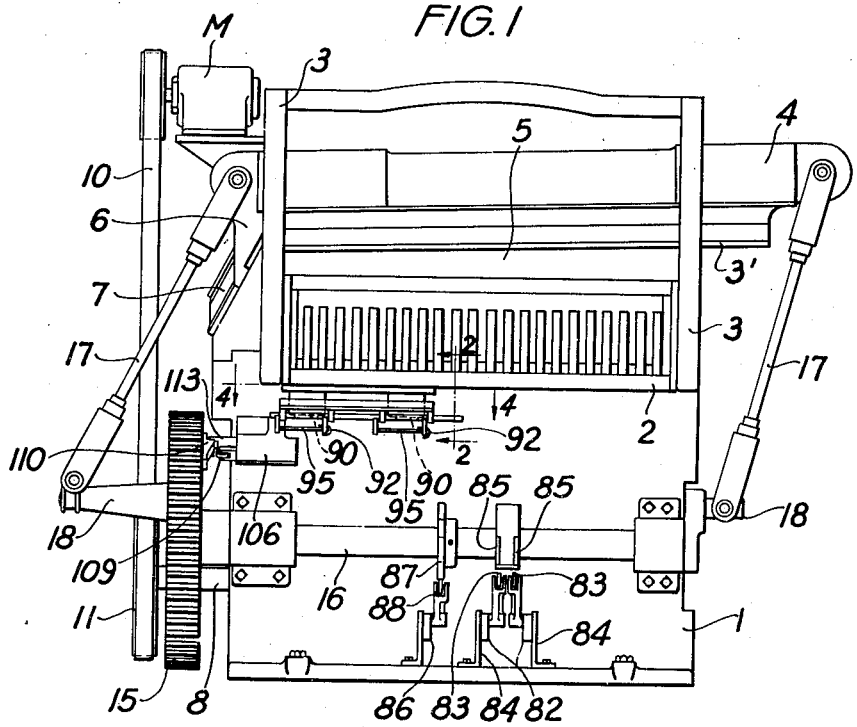

Aug. 13, 1940.    H. G. DEWEY    2,210,886
SAFETY CONTROL FOR SQUARE CUTTERS
Filed March 4, 1938    4 Sheets-Sheet 2
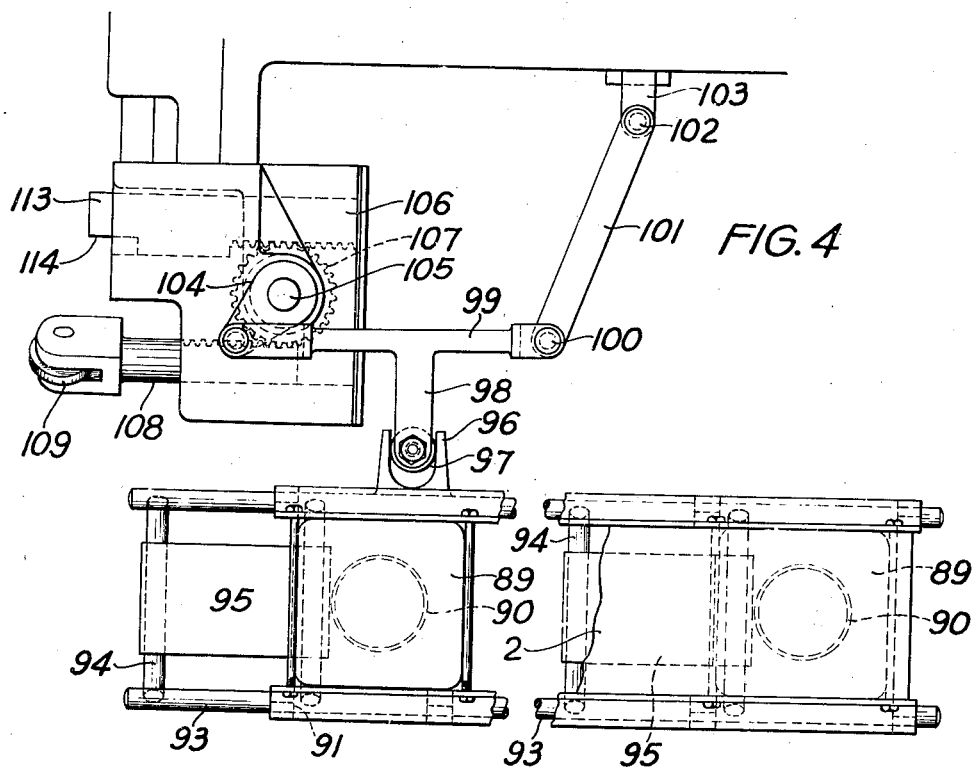
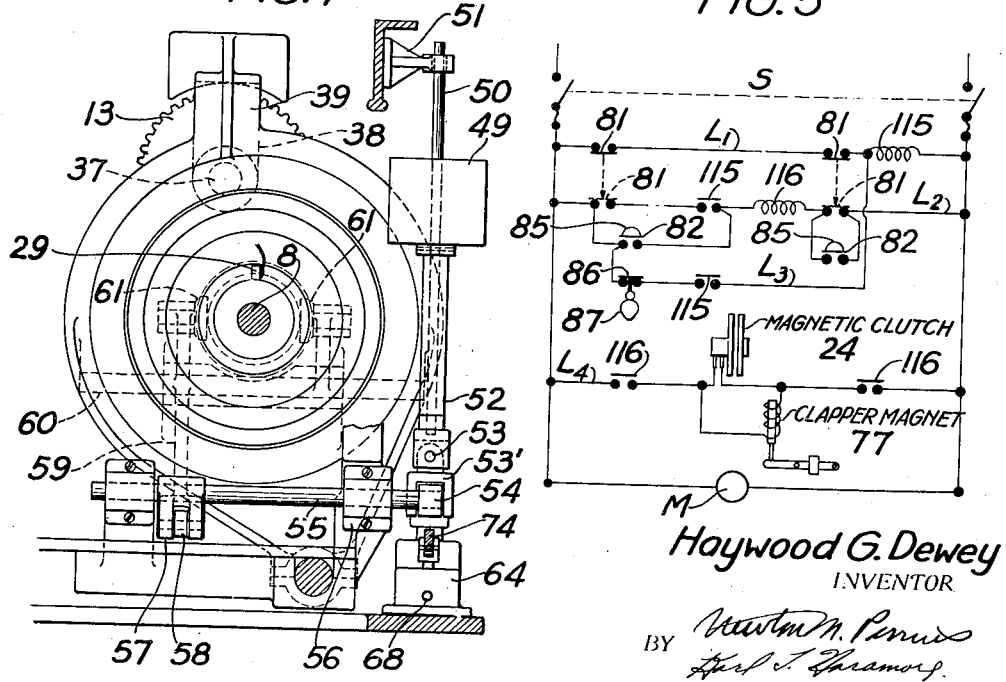
Haywood G. Dewey
INVENTOR
BY
ATTORNEYS Aug. 13, 1940.  H. G. DEWEY  2,210,886
SAFETY CONTROL FOR SQUARE CUTTERS
Filed March 4, 1938   4 Sheets-Sheet 3
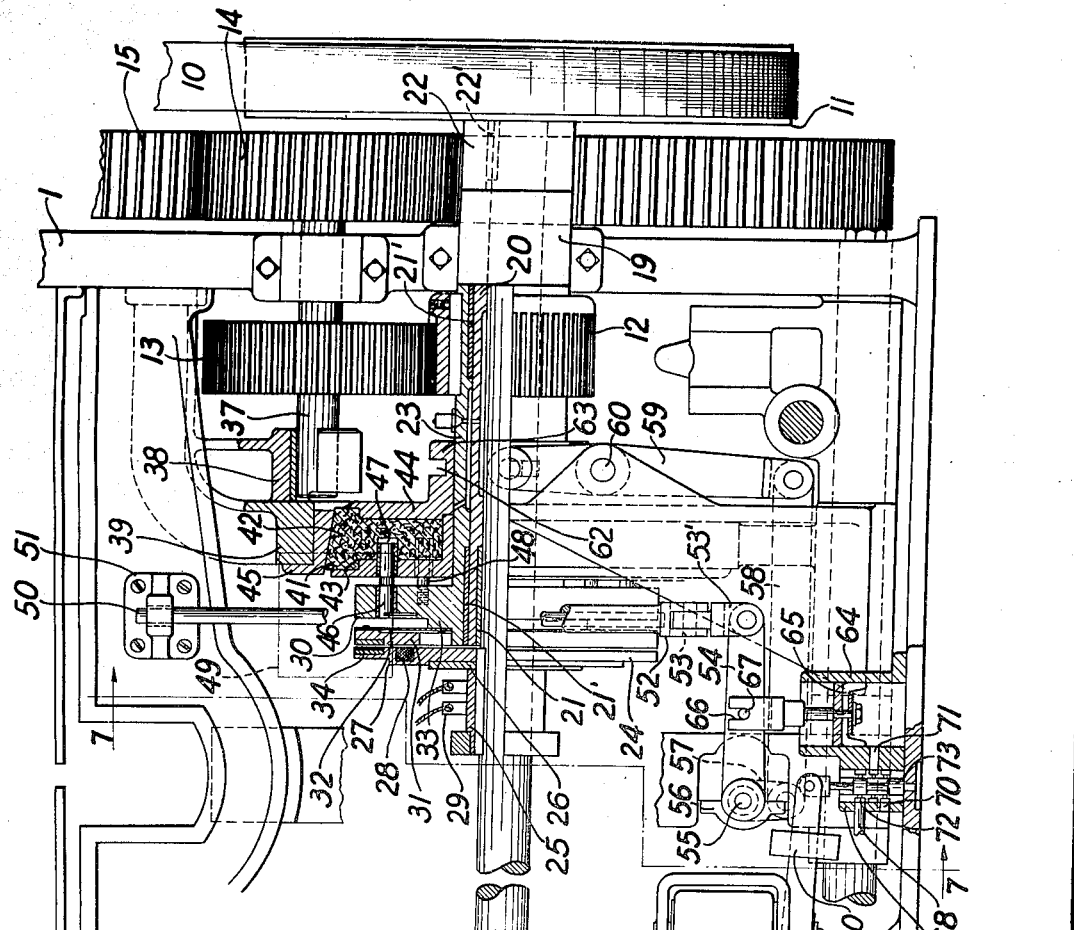

Patented Aug. 13, 1940

2,210,886

UNITED STATES PATENT OFFICE 2,210,886

SAFETY CONTROL FOR SQUARE CUTTERS

Haywood G. Dewey, Rochester, N. Y., assignor to Eastman Kodak Company, Rochester, N. Y., a corporation of New Jersey Application March 4, 1938, Serial No. 193,901

20 Claims. (Cl. 192—131)

The present invention relates to a two-handed safety control which is particularly desirable for use with paper cutting machines though not limited in any sense thereto.

Many different forms of safety devices have been devised for cutting machines, punch presses, and the like, in an effort to make such a means fool proof so far as injury to the operator is concerned. One important step in this direction was the introduction of the idea of necessitating the use of two hands in starting the machine, the control members being located so remote from the knife or ram that the hands of the operator could not be injured. The clutch and brake of such machines have been interconnected with the control member to insure simultaneous application of the brake and disengagement of the clutch should the operator fail to perform the necessary operations in their proper sequence. And as a further step in the direction of safety, electric control circuits have been provided which are arranged so as to be automatically broken by a driven member of the machine after said machine has completed a given cycle of operation.

Safety controls have been devised which incorporate all of these features, as well as others not mentioned, into one control system; but they have been so combined that the operation of one part depends upon the proper adjustment or operation of another, and for this reason such a control system is not, therefore, positive in its action. For instance, where a clutch and brake are interconnected so as to be simultaneously operated to start or stop a machine through the operation of a shipper bar or the like, it stands to reason that unless the two are properly adjusted relative to one another, and maintained so, that the brake may not be fully applied when the clutch is disengaged, or vice versa. By way of example, other safety controls depend upon the function of springs for operating certain parts of a machine, and it will be obvious that a spring after repeated compression and expansion will lose its initial tension whereby it will fail to perform its designated function in the manner required. The above noted examples of ways in which known safety control systems might fail to perform the functions for which they were designed is by no means exhaustive, but are merely pointed out to show some of the defects which my novel safety control system is designed to overcome.

One object of the present invention is the provision of an electric safety control for cutting machines, and the like, which is designed so that the clutch, brake, and lock pin are entirely independent of one another so that mal-adjustment of one part will not affect the operation of another. Another object is the provision of a safety control wherein no springs are used for operating any of the major members, such as the brake, clutch, etc., thus eliminating the danger of spring failure. Still another object of the present invention is the use of gravity actuated means for applying the brake, such means being the nearest approach to a fool proof actuating member that there is. A further object is the provision of a two-handed control wherewith both hands must be simultaneously used to start and maintain the machine in operation for a given part of the complete cycle. Another object is the provision of an adjustable limit switch which is actuated by the driven mechanism to maintain the circuit for a given cycle of operation of the machine regardless of whether the start buttons are operated or not. Another object is the provision of a reset switch operated by the driven mechanism and which alters the control system in such a way that the start switches must be released and re-operated after the machine has completed a given cycle in order to again start the machine. And yet another object is to provide a mechanically operated guard mechanism for covering the start buttons, and which, after the machine has completed a given cycle, is actuated by the driven mechanism to knock the hands of the operator off of the start buttons should the operator forget to remove the same. And still another object is to provide a cutting machine which is adapted for a single cycle operation, and cannot be made to repeat accidentally or intentionally. And a further object is to provide a safety control wherein the electric circuit can be replaced by a pneumatic system without sacrificing any of the advantages possessed by said electric circuit control.

In accordance with the preferred embodiment of my invention, the safety control system comprises a pair of spaced manually operated switches, in series, which are biased to an open position, and, therefore, must be actuated and held simultaneously to maintain the circuit through a magnetic clutch. The brake is normally applied by a weight acting through a suitable linkage, and the weight is rendered ineffective by being supported by an air cylinder to which an air supply is controlled by a magnet connected into the circuit in parallel with the magnetic clutch. After the knife has reached the end of its down stroke, a cam on the bull gear shaft closes and holds closed a limit switch in the circuit until the knife reaches the top of its stroke, said limit switch serving to maintain the circuit closed sans the hand switches until the upward stroke of the knife is completed. A reset switch is operated by a cam on the bull gear shaft to momentarily interrupt the circuit as the knife starts its up stroke. The action of this reset switch necessitates release and re-operation of the manual switches before the machine can be restarted. To insure release of the manual switches at the end of the upward stroke of the knife, a guard, which is adapted to cover the starting switches when the machine is not operating and which is moved aside to start the machine, is moved over the switches by an actuating pin engaging a cam on the bull gear. This guard pushes the operator's hands from the start buttons when one stroke of the knife has been completed, providing of course the operator's hands are held on said switches throughout the cycle of the machine. To further supplement the reset switch and insure against accidental repeat, a locking pin is moved into the path of a stop lug on the bull gear when the knife has reached the end of its complete stroke.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which, Fig. 1 is a front elevation of a cutting machine incorporating my safety control system, and showing the start buttons, guard therefor, the actuating, and locking pin connected to said guard, and the reset and limit switches connected to the bull gear shaft, all in the position they assume when the knife is at rest at the top of its stroke, Fig. 2 is a section taken substantially on line 2—2 of Fig. 1, and showing the connection between the switch guard, the actuating pin, and the locking pin, Fig. 3 is a perspective of the cam and stop lug which is mounted on the side of the bull gear to cooperate with the actuating and locking pins, Fig. 4 is a plan view of the switch guard taken substantially on line 4—4 of Fig. 1, and showing the connection between the guard, the actuating pin, and the locking pin, Fig. 5 is a wiring diagram of the electric circuit for the control system, Fig. 6 is an enlarged partial view of the rear end of the cutting machine, partly in section and partly in elevation, and showing the driving mechanism for the knife, Fig. 7 is a section taken substantially on line 7—7 of Fig. 6, and Fig. 8 is a diagrammatic showing of a modified form of my control system adapted to use a fluid operating medium instead of the electric circuit shown in conjunction with the preferred embodiment of my control.

Like reference characters refer to corresponding parts throughout the drawings.

Although my safety control system may be used on any cutting machine, punch press, or machine having a given cycle of operation and needing protection for the operator, for the purpose of illustration I have chosen to show it applied to a well-known cutting machine the operating parts of which are mounted in a solid casting 1 forming a supporting standard and frame-work for the various shafts and operating mechanisms of the machine. Upon the upper portion of this framework and above the horizontal table 2 are the side standards 3, 3 for holding and guiding the knife carrier 4 and the pressure bar 5. A knife 3' is secured to the lower margin of the knife carrier. The pressure bar and knife carrier are adapted to reciprocate in the side standards 3, 3, as is well understood in this art, the pressure bar moving downwardly to clamp the paper, not shown, during the cutting operation. The knife carrier 4 is given a diagonal or shearing movement by means of guide member 6 thereon engaging in the diagonal guide slot 7 in the frame.

Mounted in suitable bearings in the rear of the frame, see Fig. 6, is the power shaft 8, bearing the fly wheel 9, which shaft receives its power by a belt 10 and pulley 11 from the motor M. The driving power is communicated, as will be fully described hereinafter, from the power shaft 8 by a train of pinions and gears 12, 13, and 14 to the bull gear 15 which is fixed to one end of the bull gear shaft 16 journaled in the front of the frame by suitable bearings. The knife carrier 4 is coupled at each end outside of the framework by the pulling bars 17, 17 with crank pins 18, 18 on each end of the bull gear shaft 16, under the rotation of which the knife carrier 4 and the knife 3' attached thereto is reciprocated during the operation of the machine.

The foregoing general description of the cutter and its operation is common to any cutting machine of this type and is merely disclosed to give a basis for the following more detailed description of parts and their cooperation which are combined to make up my novel safety control system. Referring now to Fig. 6, wherein details of the driving mechanism for the knife is shown, the power shaft 8 is rotatably mounted at either end in suitable bearings fastened to the sides of frame 1. The bearing for the right end of the power shaft, looking at Fig. 6, comprises a bearing housing 19 bolted to the side of frame 1, and through which extends the elongated sleeve 20. This sleeve 20 is rendered stationary in any suitable manner, such as being keyed to the bearing housing 19, and the power shaft 8 is rotatably mounted relative thereto and extends completely therethrough. To insure smooth rotation of the power shaft 8 in the sleeve 20, the sleeve may be provided with inserts 21 of bearing metal. The hub 22 of the pulley 11 abuts the bearing housing 19, and said pulley is keyed to the power shaft as indicated at 22'. Rotatably mounted on the stationary sleeve 20, and spaced from said sleeve by bearing metal inserts 21', is a driven sleeve 23 which serves as part of the driven mechanism.

The customary magnetic clutch, indicated generally at 24, is used to connect the power shaft 8 and the driven sleeve 23. These magnetic clutches are generally used to connect a driving and driven shaft which are coaxial, but in this instance the clutch is mounted, as will be fully hereinafter described, so as to connect the driving shaft 8 and the driven sleeve 23 rotating thereon. The driving member of the clutch includes a hub 25 which is keyed to the power shaft and having a flange 26 carrying a field member 27 in which is mounted the electro-magnetic winding 28. The electro-magnetic winding 28 is supplied with current through slip rings, not shown, carried by the hub 25 and which are engaged by brushes 29 connected into the circuit. The driven member of the clutch includes a flange 30 which is integral with the driven sleeve 23 and to which the clutch armature 31 is preferably secured in the usual manner to an annular spring disk 32, the latter being centrally fixed to the side of a hub member 33 of the flange 30 adjacent the clutch field whereby said armature and spring disk are supported for rotation independent of the field member, and are held against axial movement relative thereto excepting the spring biased movement of the armature 31 common to clutches of this nature. As the circuit to the brushes 29 is closed the electro-magnetic winding 28 is energized to draw the armature 31 toward the field member 27 whereupon a frictional engagement is set up between the armature and field members by virtue of the friction ring 34 on the field member. In addition to this frictional engagement, the driving field member 27 and the armature 31 are held together by a flux induced by the electromagnetic winding 28. Keyed to the driven sleeve 23 is a clutch pinion 12 which engages and drives the intermediate gear 13 fixed to the shaft 37 journaled at one end in the side of frame 1, and journaled at the other end in a cradle bearing 38 supported by the brake shoe frame 39 fixed to the framework of the machine. Fixed to the shaft 37 is a bull gear pinion 14 which engages and serves to drive the bull gear 15 which in turn reciprocates the knife carrier 4 in the well-known manner.

The brake mechanism for stopping the driven mechanism and subsequently the knife, should the proper sequence of operations be neglected, will now be described. The brake proper includes a cone-shaped member 41 which is slidably mounted on the driven sleeve 23, and which is made up of a suitable friction material 42, such as tarred fiber, held between a pair of hubbed flanges 43 and 44. The periphery of the friction material is tapered to properly engage a tapered brake shoe 45 fixed to the brake shoe frame 39 when the brake member is slid along the sleeve 23 to stop the driven mechanism. The brake member 41 is drivingly connected to the sleeve 23 by means of a plurality of flexible pins 46 which are spaced around the face of the flange 30. These pins extend through the flange 30 and are fixed against axial movement relative thereto in any suitable manner. Said pins extend into recesses 47 in the brake member 41, and the recesses 47 are made deep enough so as to allow the brake member sufficient movement axially of the sleeve 23 to engage or release the brake shoe 45. These pins are preferably made flexible to overcome or absorb the shock induced when the machine is started or stopped suddenly, and a plurality of rigid pins, indicated at 48, may be provided between the flange 30 and the brake member to connect the sleeve and brake member to hold them against relative rotation should the flexible pins accidentally become sheared off.

The brake member 41 is normally moved axially of the sleeve 23 and into engagement with the brake shoe 45 by a weight 49 fixed to the vertical rod 50 which is slidably mounted at its upper end in a bracket 51 fixed to the frame of the machine, see Figs. 6 and 7. The linkage for translating the vertical movement of the weight 49 to a longitudinal movement of the brake member relative to the sleeve 23 includes a tubular yoke member 52 in which the lower end of the rod 50 is keyed and which is pivoted at 53 to a stub yoke member 53' which is in turn pivoted at one end to the horizontal lever 54. This horizontal lever 54 is fixed at its other end to one end of rock shaft 55 rotatably mounted in the bearings 56 supported in the frame of the machine. Fixed to the rock shaft 55, and extending substantially vertically downward therefrom, is another stub yoke member 57 which is in turn pinned at one end to a push and pull member 58 the other end of which is pinned to the lower end of lever 59. Lever 59 is pivoted intermediate its ends on a rod 60 supported in the frame of the machine, and the upper end of said lever takes the form of a yoke the ends 61 of which extend into a groove 62 in the hub 63 integral with the flange 44 of the brake member 41, whereby the pivotal movement of the lever 59 serves to move the brake member longitudinally of the sleeve 23 into or out of its braking position depending of course upon the direction in which the lever 59 is moved. The stub yoke member 53' is connected between the tubular yoke member 52 and the lever 54 to act in the capacity of a knuckle whereby the tubular yoke member 52 is permitted to move in a vertical direction and still transmit movement to the end of lever 54 which necessarily moves in an arcuate path. It will be understood that by means of this above-described linkage, when the weight 49 falls the brake is moved to its stopping position, and when the weight is raised, the brake member 41 is moved longitudinally of the sleeve 23 to its releasing position.

The weight 49 is raised and supported in its raised position by an air cylinder 64 mounted on the base of the machine. The upper end of the piston 65 of the air cylinder extends substantially above the cylinder and takes the form of a U the sides of which are slotted, as indicated at 66, to receive a pin 67 extending perpendicularly through the horizontal lever 54. Air under pressure is supplied to the air cylinder 64 from the air line 68, and the admission of air to and the exhaust of air from the cylinder is controlled by the cage valve 69 which has three ports, an exhaust port 70, a port 71 leading from the cage to the air cylinder, and a port 72 connecting the air line to the valve cage. The valve cage is controlled by the valve 73 which has two positions, one shown in Fig. 6, its lower position wherein it opens the exhaust port 70, port 71 leading to the air cylinder, and closes port 72, to allow the air cylinder to exhaust under which condition the weight 49 will fall to apply the brake; and a second position where the exhaust port 70 is closed and air is admitted to the cylinder 64 to raise and support the weight 49 whereupon the brake is disengaged.

The movement of the valve is controlled by gravity and electro-magnetic means. The upper end of the valve stem is connected to one end of the lever 74 the other end of which is pivoted at 75 to a standard 76 mounted on the base of the machine. Carried by the standard 76 is a clapper magnet 77, well known in the art, which is connected in line L4 of the electric circuit in parallel with the magnetic clutch, see Fig. 5. The armature for the clapper magnet is fixed to the upper side of the lever 74 so that when the circuit through the clutch and clapper magnet is made, the magnet is energized and pulls the armature on the lever 74 upward whereupon the valve 73 is moved to its second position wherein air is supplied to the air cylinder and the brake is released. The magnet will hold the valve in this position so long as the circuit therethrough is maintained, and upon line L4 of the circuit becoming broken, the valve 73 will be returned to its first position by gravity wherein the air cylinder is allowed to exhaust and the weight 49 to fall and apply the brake. To insure a rapid movement of the valve 73 to its exhaust position, the weight 80 is fixed to the lever 74, said weight adding to the weight of the parts normally tending to move the valve downward.

Referring now to Figs. 1 and 5, it will be observed that the electric circuit through the magnetic clutch and the clapper magnet is controlled by two manually controlled push switches 81, 81 located beneath the horizontal table 2 of the machine, and which are spaced apart so that both hands are required to operate them. These switches are biased to an open position, and are connected in series so that they must be simultaneously closed and held closed to energize and maintain the circuit through the magnetic clutch 24 and the clapper magnet 77. After the knife 3' reaches the bottom of its stroke and starts upward, the danger of the operator being injured is past. Therefore, so that the operator may use that time required for the knife to rise for something useful, a pair of limit switches 82, 82, normally biased to an open position, are connected in shunt with the hand switches 81, 81, said limit switches serving to maintain the circuit through the magnetic clutch and clapper magnet when the hand switches are in their open position. As shown in Fig. 1 these limit switches may be closed when contactors 83, 83 pivotally mounted on standard 84, 84 fixed to the base of the machine are engaged and moved by cams 85, 85 fixed on the bull gear shaft 16 to rotate therewith. The cams 85, 85 may be adjustably mounted on the bull gear shaft so that the period of the cycle of the machine during which they assume control can be varied as desired.

The machine is made a single stroke cutter and undesirable repeats are prevented by placing a reset switch 86 in the circuit, as shown in the wiring diagram of Fig. 5. Referring to the wiring diagram of Fig. 5, it will be noticed that the manual push switches 81, 81 are connected in series in line L1 across the main line and are normally held in their full line position, their open position, when in an inoperative position. The coil of a double pole contactor 115 is connected in line L1 so that when the main line switch S is closed the circuit is completed through the driving motor M and through the line L1 whereupon the coil of contactor 115 is energized to close the two contactors 115 controlled by said coil. When the two switches 81, 81 are moved to their start position, indicated by dotted arrows and dotted line positions, the circuits through lines L2 and L3 are completed, contacts 115 having previously been closed by energization of coil 115. When circuit L2 is completed the coil 116 of another double pole contactor is energized and closes the two contacts 116 in line L4 whereupon the magnetic clutch and clapper magnet are energized. As the knife reaches the bottom of its stroke the limit switches 82, 82 are closed by the cams 85, 85 to maintain the circuit through the clutch and clapper magnet independently of the hand switches 81, 81 until the knife reaches the top of its stroke when they are automatically opened. The reset switch 86 is normally closed, and is momentarily opened at the beginning of the up stroke of the knife whereupon the coil of contactor 115 is de-energized and contacts 115 controlled thereby return to their normal open position. This occurrence necessitates the release and reactuation of the hand switches 81, 81 in order to again start the machine as will be readily understood. The reset switch 86 is biased to a closed position and is momentarily open when the reset cam 87 of the bull gear shaft 15 engages and moves the contactor 88 of the reset switch, see Fig. 1. This reset cam 87 is adjustably mounted on the bull gear shaft so that it can be adjusted to operate at the proper time in the cycle of the knife, i. e. at the beginning of the upward stroke.

It will be obvious that the two limit switches 82, 82 could be replaced by a single limit switch providing said switch was a double pull switch. However, there are advantages to using two limit switches in order to insure the reliability of operation. Each switch is installed in opposite sides of the DC line to prevent false operation due to grounds. The hand switches are also in opposite sides of the line to prevent false operation due to grounds, as are the contacts 116 of the double pole contactor actuated by coil 116 for the same reason.

Referring now to Figs. 1-4, structure will be described for further insuring against accidental repeats which happen and which are dangerous in the operation of these machines, and since this structure serves in the same basic capacity as the reset switch 86, it is in effect an additional safety feature insuring proper stopping of the machine in the event that any of the electrical control members should fail for any reason. The hand switches 81, 81 are housed in palm stations 89, 89 which are attached to the under side of the table 2; and the switches are closed by depressing buttons 90, 90 of said palm stations. Slidably mounted in brackets 91 and fastened to both sides of the palm stations is a guard member 92 comprising rods 93, 93 connected by cross members 94, 94 to which shields 95, 95 are fixed. When the guard member is slid to the right, see Fig. 1, the shields 95, 95 will cover the palm stations 89, 89 and render the push buttons 90, 90 inaccessible. In order to get at the push buttons to start the machine, the operator must first slide the guard member 92 to the left to uncover said push buttons.

Fastened to and extending from inside guide rod 93 through a slot in the bracket 91 is a slotted member 96 into which a roller 97 on the arm 98 of the rod 99 extends. One end of the rod 99 is pivoted at one end 100 to the link 101 while the other end of said link is pivoted at 102 to a bracket 103 on the frame of the machine, see Fig. 4. The other end of the rod 99 is pivoted to one end of a crank 104 attached to a shaft 105 extending through the gear housing 106 so that as the rod 99 is moved back and forth said shaft is oscillated. Fixed to the shaft 105 contained in the housing is an elongated spur gear 107 which rotates therewith. Located near the bottom of the gear housing and slidably mounted therein is an actuating pin 108 having a roller 109 mounted in the yoke end thereof. This actuating pin is essentially a rack member, being provided with gear teeth on one side which engage the spur gear 107 at its lower end to be moved in and out of the gear housing toward or away from the bull gear 15 when the guard member 92 is slid between its two positions.

Fastened to the inside face of the bull gear 15 is a member 110 serving as a combined cam plate and stop lug, see Figs. 1 and 3. The member 110 is provided with a cam member 111 and a stop lug 112 which are offset relative to one another. The cam 111 and the stop lug 112 are shown as identical in shape, but when mounted on the bull gear which rotates in the direction indicated by the arrow, it will be understood how one acts as a cam and the other as a stop lug. The member 110 is mounted on the inside face of the bull gear so that the cam 111 will be in the path of the roller 109 on the actuating pin, and is so located on the gear that just as the knife reaches the top of its stroke, the cam 111 moves the actuating pin to the right, looking at Figs. 1 and 4, thereby causing the guard member 92 to be moved to the right knocking the operator's hands from the switch buttons should he have held them thereon throughout the cycle of the knife 3'. When the guard member 92 is slid to make the push buttons 90 accessible, the actuating pin 108 is again moved into the path of the cam 111, but now on the opposite side thereof so that it won't be moved by said cam until the bull gear has made one complete revolution.

In order to positively insure against accidental repeat of the machine, a stop pin 113 is slidably mounted in the upper end of the gear housing and is provided with teeth to engage the spur gear 107, see Figs. 2 and 4. It will be observed that the stop pin 113 is offset radially of the bull gear relative to the actuating pin so that the stop pin may be moved into the path of the stop lug 112 on the member 110 and not interfere with the cam 111 thereon. The stop pin is cut away to provide a flat face 114 which would engage the flat face of the stop lug 112 if for any reason they come into contact. The stop pin 113 and actuating pin 108 are so connected to the spur gear that when one is moved out of the gear housing the other is retracted thereinto. With this construction it will be understood that when the bull gear 16 has made one complete revolution and the cam 111 moves the actuating pin 108 and subsequently moves the guard member 92 to its covering position relative to the push buttons, that automatically the stop pin 113 is moved into the path of the stop lug 112 on the bull gear. If for any reason the machine should attempt to repeat, the stop lug 112 on the bull gear will come against the stop pin 113 and the resistance set up thereby will be sufficient to rupture a safety washer, or the like, connecting one of the gears to its respective shaft whereupon the machine will stop. It will be noticed that when the guard member 92 is moved to uncover the push buttons, the stop pin 113 is removed from the path of the stop lug. In order to insure complete removal of the stop pin from the path of the stop lug, the overhang of the guard member 92 relative to the push buttons is such that sufficient movement must be given said guard member to remove the stop pin 113 from the path of the stop lug 112 before any part of the push buttons becomes accessible.

The operation of the knife mechanism and its safety control will be apparent to those skilled in the art from the foregoing description of the parts. When the machine is stationary and the knife is at rest at the top of its stroke the parts are in the position shown in the drawings, or more specifically, the hand switches 81, 81 are biased open, the guard member 92 is covering the push buttons 90 of the switches, the stop pin 113 is in the path of the stop lug 112 on the bull gear, limit switches 82, 82 are biased open, the reset switch 86 is closed, the air cylinder 64 is exhausted allowing the weight 49 to apply the brake, and the magnetic clutch is not energized. To start the machine the guard member 92 is first moved to the left to render the push buttons accessible, and simultaneously the actuating pin 108 is moved into the path of the cam 111 on the bull gear 16 and the stop pin 113 is removed from the path of the stop lug 112 on the bull gear. Now the hand switches 81, 81 are simultaneously moved to their closed position, indicated by the dotted line position of Fig. 5, whereupon lines L3 and L4 are closed and the magnetic clutch and clapper magnet are energized and the brake is released. Should either or both hands be removed from the hand switches before the knife has reached the bottom of its downward stroke the circuit through lines L3 and L4 will be broken thus de-energizing the clutch and allowing the weight 49 to instantly apply the brake. When the knife has reached the bottom of its down stroke, the limit switches 82, 82 are closed by the cams 85, 85 on the bull gear shaft and are held closed until the knife reaches the top of its stroke whereupon they are allowed to open. Closure of the limit switches supplements the hand switches 81, 81 and allows the operator to move the hands from the push buttons. At the beginning of the upward stroke of the knife and just prior to the release of the hand switches 81, 81 the reset cam 87 serves to momentarily break the circuit by opening reset switch 86 which de-energizes contactor coil 115 allowing contactors 115 controlled thereby to return to their open position. This reset switch makes the cutter a single stroke machine, and insures against a repeat subsequent to the operator holding the hand switches closed throughout the complete cycle of the knife and into the next cycle, or to insure against a repeat occurring due to the hand switches becoming stuck in a closed position. As the knife completes its stroke, the cam 111 on the bull gear 15 engages and moves the actuating pin 108 whereupon the guard member 92 is returned to its covering position relative to the push button and the stop pin 113 is again moved into the path of the stop lug on the bull gear.

From the above description it will be obvious to one skilled in the art that my safety control system comprises an arrangement of parts wherein one part is not dependent upon its proper adjustment relative to another part for its operation. This arrangement overcomes the disadvantages of controls wherein the brake and clutch are connected and operated by a shipper bar or any other mechanically operated structure which is common to the two. It will be readily appreciated that in my control the brake is entirely independent so far as its operation is concerned with relation to the clutch, and should the clutch fail to release for any reason, other than failure of the electric circuit to become interrupted, the brake will operate and stop the machine regardless of the clutch. Further, by providing a control where the brake and parts necessary to the operation thereof are moved to their brake applying position by gravity actuated means instead of springs, or the like, which are subject to proper adjustment for their operation, I have made use of the surest operating means that there is. A spring when used as an actuating member can fail under repeated operation, but a falling weight is not subject to fatigue of this sort. Although so many interconnected safety arrangements may seem unnecessarily complicated, this is not actually the case because each part has a definite operation which is essential. The electric features enable accurate and easy control, and the mechanical safety features provide additional safety protection should the electrical parts fail to function properly.

In Fig. 8 I have shown diagrammatically a modified form of my control system, and how a fluid power system can be used in place of the electric circuit used in the above described preferred embodiment to accomplish the desired results without going beyond the scope of my invention. As illustrated, fluid under pressure, for instance air, is supplied through a pipe line 120 in the direction of the arrow from any suitable source, i. e. an air compressor. A pair of cage valves 121 and 122 are placed in series in the line so that both must be operated simultaneously to obtain pressure throughout the line. The cage of valve 121 is provided with three ports, 123 for permitting air to flow from the supply line into the cage, 124 for permitting air to flow from the cage to the line leading to the other valve cage, and 125 an exhaust port. The cage of valve 122 is also provided with three ports, 126 permitting air to enter cage 122 from the line 120, port 127 permitting air to flow through the cage and into that part of the line indicated as 120', and port 128 an exhaust port.

The valve 129 in the cage 121 and the valve 130 in the cage 122 are each capable of an opened and closed position, and are normally held in their closed position by virtue of air supplied to the air cylinder 131 through the branch line 119, the valve being provided with piston stems 133 sliding in the cylinder 131. In their exhaust position, the valve 129 closes port 123 and opens ports 124 and 125, and the valve 130 closes port 127 and opens ports 126 and 128. In Fig. 8 both valves are shown depressed to their open positions to permit air to flow through the line into that portion indicated as 120'. The drives illustrated include a drive shaft 135 and a driven shaft 136 which are coaxial. The driven shaft 136 is connected to the drive shaft 135 by moving the driving clutch member 137 into frictional engagement with the driven clutch member 138 fixed to the end of the driven shaft. The driving clutch member may be connected to the drive shaft in any suitable manner to allow the same to slide axially of the shaft but to rotate with the shaft. The linkage for engaging and disengaging the clutch includes a forked lever 139 engaging the grooved collar 140 integral with the driving member of the clutch, and a lever system including links 141, 142, 143, rock shaft 144, and lever 145, the arrangement of which will give a pull or push to the driving clutch member 138 as the lever 145 is raised and lowered, such movement causing the clutch to be engaged or disengaged as will be obvious from the drawings. A weight W supported on the end of lever 145 normally tends to disengage the clutch, and this weight is raised and supported by the piston 146 in the air cylinder 147 which is connected into the line 120' when the air is applied to said line.

The brake for the driven shaft 136 includes a stationary brake shoe 150 which is engaged by a cone brake member 151 connected to the shaft for rotation therewith, but being capable of axial movement with respect thereto. Movement of the brake member 151 is accomplished through a lever system including a pivoted forked lever 152 engaging the grooved collar 153 integral with the brake member, links 154, 155, rock shaft 156, and lever 157. It will be readily understood how upward movement of the lever 157 causes disengagement of the brake and downward movement of said lever applies the brake. Here again a weight W' is supported on the end of the lever 157 tending to apply the brake, and this lever and weight are raised and supported by a piston 158 operating in the air cylinder 159 connected in the line 120' when air is supplied thereto.

In Fig. 8 the hand valves 129, 130 are shown depressed to admit air to the line in which instance the air cylinders 147 and 159 are receiving air so that the pistons 146 and 158 raise and support the levers 145 and 157 to engage the clutch and disengage the brake. In the branch 118 of the pipe line is situated a limit valve 160 which normally closes this branch of the line when the knife is making a down stroke so that pressure will be maintained in that portion of the line including the air cylinders 147 and 159; and which is adapted to be automatically opened when the knife reaches the bottom of its stroke to maintain pressure in the line independently of the hand valves throughout the upward stroke of the knife as will be fully described hereinafter. The limit valve 160 is normally moved to and held in a closed position by air entering an air cylinder 161 through the feed line 162. The limit valve 160 is moved to its open position against the action of the air cylinder 161 by a limit cam 163 mounted on the bull gear shaft 16', said cam being adjusted so as to open the valve 160 just as the knife reaches the bottom of its stroke, and to hold said limit valve open until the knife reaches the top of its stroke where it is allowed to close. This limit valve 160 serves the same purpose in this pneumatic system as does the limit switch used in connection with the electric circuit, namely to maintain the machine in operation automatically during the up stroke of the knife without necessitating the operator holding the manual valves closed during this period of the cycle of the machine. So that pressure will be maintained in that portion of the line including the air cylinders 147 and 159 when the limit valve is opened, the normally opened valve 165 is placed in line to be closed when the limit valve is opened. This valve 165 is normally held in an open position by the air cylinder 166 which is connected to the feed line 162 connected into branch 118 of the line, and is normally held in an open position so that air may be admitted to the air cylinders 147 and 159 when the hand valves 129 and 130 are operated. The valve 165 is automatically closed when the limit valve 160 is opened by virtue of the pressure member 167 connected at one end to the rock shaft 168, said rock shaft being rotated by a lever 169 connected thereto and depressed by another cam 170 connected to the bull gear shaft. The cam 170 is adjusted on the bull gear shaft relative to the limit cam 163 so that when and while the limit valve is held open the valve 165 is closed and held closed. This relation of valves, it will be readily understood, serves to maintain a pressure in that portion of the line including the air cylinders 145 and 159 independently of the hand valves.

That branch of the pipe line indicated as 120' is provided with a by-pass 171 around cage valve 122, this allowing for an exhausting of the line should either hand valve be released before the knife reaches the bottom of its stroke. Referring to Fig. 8, it will be understood that when the knife is at rest at the top of its stroke the machine is started by opening the hand valves 129 and 130, as shown. With the valves in this position the exhaust ports 125 and 128 in each valve cage are closed and the air is allowed to pass from the supply line and into the branch 120' of the line to raise and support the pistons 146 and 158 to engage the clutch and release the brake. The limit valve 160 being closed during the down stroke of the knife, the air pressure is built up in the branch 120' of the line and will be maintained so long as the hand valves are held open. Should valve 129 be released before the knife 3' reaches the bottom of its stroke, the exhaust port 125 will be opened and the line 120' will be exhausted therethrough whereupon the clutch will be disengaged and the brake will be applied through the action of the weights W and W' respectively. Should valve 130 be individually released, its exhaust port will be opened and the air from line 120' will be exhausted therethrough by passing around the by-pass 171. Should only valve 129 be opened in attempting to start the machine, the air will take the line of least resistance and will flow out through the exhaust port 128 in valve cage 122 instead of going around the by-pass 171 and into that branch of the line indicated by 120'. If valve 122 is actuated alone in an attempt to start the machine, nothing will happen because valve 129 is closed cutting off the air supply. The hand valves can be provided with a guard member 92' which is slidably mounted on the machine to move between the covering position in which the hand valves 129 and 130 are rendered inaccessible and an uncovering position in which the hand valves are accessible, in the same manner as guard member 92 described in connection with the control using an electrical power means. Guard 92' is connected to an actuating pin 108' and a stop pin 113' through a spur gear 107', said pins cooperating with a cam 111' and stop lug 112' on the bull gear 15' in a manner described above in connection with the preferred embodiment of the invention. After the knife 3' has reached the top of its stroke, the limit valve 160 is automatically moved to its closed position, and the valve 165 is automatically opened to allow the branch of the line including the air cylinders 147 and 159 to exhaust through the exhaust ports 125 and 128 in the cage valves 121 and 122 respectively.

From this description it will be readily appreciated that the operation of my novel control system is substantially unaltered when a pneumatic system is substituted for the electric circuit to serve as a power means for operating the clutch and brake. Gravity actuated means is used for normally applying the brake and disengaging the clutch, and the clutch and brake are entirely independent of one another in their operation.

While I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I declare is new and desire to secure by Letters Patent of the United States is:

1. A cutting machine comprising a driving mechanism, a driven mechanism, a line for transmitting power to said machine, a plurality of manually operated power interrupting means in series in said line and biased to a line opening position, a normally inoperative clutch for connecting the driven and driving mechanisms, said clutch connected to the power line so as to be operated when power flows through said line, a brake independent of said clutch and for stopping the driven mechanism, a gravity actuated means normally tending to operate said brake, a fluid cylinder connected to the gravity actuated means and arranged to support said gravity actuated means when fluid is admitted thereto, said fluid cylinder connected to the power line so that the fluid is admitted thereto when power is passing through said line, and is cut off from the cylinder allowing the gravity actuated means to actuate the brake when power is cut off from the power line.

2. A cutting machine comprising a driving mechanism, a driven mechanism, a line for transmitting power to said machine, a plurality of manually operated power interrupting means in series in said line and biased to a line opening position, a normally inoperative clutch for connecting the driven and driving mechanism, said clutch connected to the power line so as to be operated when power flows through said line, a brake independent of said clutch and for stopping the driven mechanism, a gravity actuated means normally tending to operate said brake, a fluid cylinder connected to the gravity actuated means and arranged to support said gravity actuated means when fluid is admitted thereto, said fluid cylinder connected to the power line so that the fluid is admitted thereto when power is passing through said line, and is cut off from the cylinder allowing the gravity actuated means to actuate the brake when power is cut off from the power line, and automatically operated means for maintaining power in said line regardless of the position of the manually operated means until a given cycle of the driven mechanism has been completed.

3. A cutting machine comprising a driving mechanism, a driven mechanism, a line for transmitting power to said machine, a plurality of manually operated power interrupting means in series in said line and biased to a line opening position, a normally inoperative clutch for connecting the driven and driving mechanisms, said clutch connected to the power line so as to be operated when power flows through said line, a brake independent of said clutch and for stopping the driven mechanism, a gravity actuated means normally tending to operate said brake, a fluid cylinder connected to the gravity actuated means and arranged to support said gravity actuated means when fluid is admitted thereto, said fluid cylinder connected to the power line so that the fluid is admitted thereto when power is passing through said line, and is cut off from the cylinder allowing the gravity actuated means to actuate the brake when power is cut off from the power line, a limit interrupting means for controlling the flow of power through the line independently of the manually operated interruption means, and means connected with said driven mechanism for actuating and holding said limit interrupting means in an operative position throughout a given portion of the cycle of the driven mechanism.

4. A cutting machine comprising a driving mechanism, a driven mechanism, a magnetic clutch for connecting the two mechanisms together, an electric circuit for energizing said clutch, a plurality of manually operated switches in series in said circuit and biased to an open position whereby all must be simultaneously closed for maintaining the circuit, a brake independent of the clutch and for stopping the driven mechanism, a gravity actuated means normally tending to apply said brake, an air cylinder for raising and supporting said gravity actuated means when connected to an air source, and adapted to release said gravity actuated means when the air source is cut off, and an electrically operated valve for controlling the air supply to said cylinder, said valve connected into the electric circuit and arranged so that when the circuit is closed air is admitted to the air cylinder to raise and support the gravity actuated means, and when the circuit is broken air is cut off from the cylinder and the cylinder is allowed to exhaust to permit the gravity actuated means to apply the brake.

5. A cutting machine comprising a driving mechanism, a driven mechanism, a magnetic clutch for connecting the two mechanisms together, an electric circuit for energizing said clutch, a plurality of manually operated switches in series in said circuit and biased to an open position whereby all must be simultaneously closed for maintaining the circuit, a brake independent of the clutch and for stopping the driven mechanism, a gravity actuated means normally tending to apply said brake, an air cylinder for raising and supporting said gravity actuated means when connected to an air source, and adapted to release said gravity actuated means when the air source is cut off, and an electrically operated valve for controlling the air supply to said cylinder, said valve connected into the electric circuit and arranged so that when the circuit is closed air is admitted to the air cylinder to raise and support the gravity actuated means, and when the circuit is broken air is cut off from the cylinder and the cylinder is allowed to exhaust to permit the gravity actuated means to apply the brake, a limit switch for maintaining the electric circuit regardless of the position of the manually operated switches and biased to an open position, and means connected with the driven member for periodically closing and holding closed said limit switch until a given cycle has been completed.

6. A cutting machine comprising a driving mechanism, a driven mechanism, a magnetic clutch for connecting the two mechanisms together, an electric circuit for energizing said clutch, a plurality of manually operated switches in series in said circuit and biased to an open position whereby all must be simultaneously closed for maintaining the circuit, a brake independent of the clutch and for stopping the driven mechanism, a gravity actuated means normally tending to apply said brake, an air cylinder for raising and supporting said gravity actuated means when connected to an air source, and adapted to release said gravity actuated means when the air source is cut off, a valve in said cylinder movable between two positions, an open position wherein air under pressure is admitted to the cylinder, and a closed position where the air supply is cut off and the cylinder is allowed to exhaust, means normally moving the valve to its closed position, and an electro-magnet in the electric circuit and connected to the valve to move the same to its open position when the magnet is energized to effect a release of the brake.

7. A cutting machine comprising a driving mechanism, a driven mechanism, a line for transmitting power to said machine, a plurality of manually operated power interrupting means in series in said line and biased to a line opening position, a guard movably mounted on the machine to move between a covering position wherein the interrupting means are rendered inaccessible thereby, and an uncovering position wherein the interrupting means are accessible, and means connected to said guard and actuated by the driven mechanism for returning the guard to its covering position at the completion of a given cycle of the driven mechanism, a normally inoperative clutch for connecting the driven and driving mechanisms, said clutch connected to the power line so as to be operated when power flows therethrough, a brake independent of said clutch and for stopping the driven mechanism, a gravity actuated means normally tending to operate said brake, a fluid cylinder connected to the gravity actuated means and arranged to support said gravity actuated means when fluid is admitted thereto, said fluid cylinder connected to the power line so that the fluid is admitted thereto when power is passing through said line, and is cut off from the cylinder allowing the gravity actuated means to actuate the brake when power is cut off from the power line.

8. A cutting machine comprising a driving mechanism, a driven mechanism, a line for transmitting power to said machine, a plurality of manually operated power interrupting means in series in said line and biased to a line opening position, a guard slidably mounted on the machine to move between a covering position wherein the interrupting means are rendered inaccessible thereby, and an uncovering position where the interrupting means are accessible, a cam carried by one member of the driven mechanism, an actuating pin connected to the guard member and adapted to be moved into the path of said cam when the guard is moved to its uncovering position, and adapted to be engaged and moved by said cam when the driven member has completed a given cycle to return the guard to its covering position relative to the interrupting means, a normally inoperative clutch for connecting the driven and driving mechanisms, said clutch connected to the power line so as to be operated when power flows therethrough, a brake independent of said clutch and for stopping the driven mechanism, a gravity actuated means normally tending to operate said brake, a fluid cylinder connected to the gravity actuated means and arranged to support said gravity actuated means when fluid is admitted thereto, said fluid cylinder connected to the power line so that the fluid is admitted thereto when power is passing through said line, and is cut off from the cylinder allowing the gravity actuated means to actuate the brake, when power is cut off from the power line.

9. A cutting machine comprising a driving mechanism, a driven mechanism, a magnetic clutch for connecting the two mechanisms together, an electric circuit for energizing said clutch, a plurality of manully operated switches in series in said circuit and biased to an open position whereby all must be simultaneously closed for maintaining the circuit, a guard movably mounted on the machine to move between a covering position wherein the switches are rendered inaccessible, and an uncovering position wherein the switches are accessible, means connected to said guard and actuated by the driven mechanism for returning the guard to its covering position at the completion of a given cycle of the driven mechanism, a brake independent of the clutch and for stopping the driven mechanism, a gravity actuated means normally tending to apply said brake, an air cylinder for raising and supporting said gravity actuated means when connected to an air source, and adapted to release said gravity actuated means when the air source is cut off, and an electrically operated valve for controlling the air supply to said cylinder, said valve connected into the electric circuit and arranged so that when the circuit is closed air is admitted to the air cylinder to raise and support the gravity actuated means, and when the circuit is broken air is cut off from the cylinder and the cylinder is allowed to exhaust to permit the gravity actuated means to apply the brake.

10. A cutting machine comprising a driving mechanism, and a driven mechanism, including a bull gear, a magnetic clutch for connecting the two mechanisms together, an electric circuit for energizing said clutch, a plurality of manually operated switches in series in said circuit and biased to an open position whereby all must be simultaneously closed for maintaining the circuit, a brake independent of the clutch and for stopping the driven mechanism, a gravity actuated means normally tending to apply said brake, an air cylinder for raising and supporting said gravity actuated means, when connected to an air source, and adapted to release said gravity actuated means when the air source is cut off, and an electrically operated valve for controlling the air supply to said cylinder, said valve connected into the electric circuit and arranged so that when the circuit is closed air is admitted to the air cylinder to raise and support the gravity actuated means, and when the circuit is broken air is cut off from the cylinder and the cylinder is allowed to exhaust to permit the gravity actuated means to apply the brake, means for insuring release of the switches at the end of a given cycle of the driven mechanism, said means including a guard mounted on the machine to move between a covering position wherein the switches are rendered inaccessible, and an uncovering position wherein the switches are accessible, a cam on the bull gear, a reciprocating actuating pin connected to said guard and arranged to be moved in one direction into the path of said cam when the guard is moved to its uncovering position, and to be moved in the other direction by said cam when the bull gear completes one revolution whereby the guard is returned to its covering position relative to the switches.

11. A cutting machine comprising a driving mechanism, and a driven mechanism, including a bull gear, a magnetic clutch for connecting the two mechanisms together, an electric circuit for energizing said clutch, a plurality of manually operated switches in series in said circuit and biased to an open position whereby all must be simultaneously closed for maintaining the circuit, a brake independent of the clutch and for stopping the driven mechanism, a gravity actuated means normally tending to apply said brake, an air cylinder for raising and supporting said gravity actuated means when connected to an air source, and adapted to release said gravity actuated means when the air source is cut off, and an electrically operated valve for controlling the air supply to said cylinder, said valve connected into the electric circuit and arranged so that when the circuit is closed air is admitted to the air cylinder to raise and support the gravity actuated means, and when the circuit is broken air is cut off from the cylinder and the cylinder is allowed to exhaust to permit the gravity actuated means to apply the brake, means for preventing a repeat of the machine after a given cycle has been completed, said means including a guard mounted on the machine to move between a covering position wherein the switches are rendered inaccessible, and an uncovering position wherein the switches are accessible, a cam on the bull gear, a stop lug on the bull gear, an actuating pin connected to the guard member and arranged to be moved into the path of the cam when the guard is in its uncovering position, and to be moved in the opposite direction to move the guard to its covering position when engaged by the cam, and a stop pin movable into and out of the path of the stop lug on the bull gear, said stop pin connected to said actuating pin so as to be moved into the path of the stop lug when the guard is moved to its covering position upon the actuating pin being moved by the cam on the bull gear.

12. A cutting machine comprising a driving mechanism, and driven mechanism, including a bull gear, a magnetic clutch for connecting the two mechanisms together, an electric circuit for energizing said clutch, a plurality of manually operated switches in series in said circuit and biased to an open position whereby all must be simultaneously closed for maintaining the circuit, a brake independent of the clutch and for stopping the driven mechanism, means normally acting to apply said brake, an electrical means connected in the circuit and when energized acting to oppose said brake applying means, means for insuring release of the switches at the end of a given cycle of the driven mechanism, said means including a guard mounted on the machine to move between a covering position wherein the switches are rendered inaccessible, and an uncovering position wherein the switches are accessible, a cam on the bull gear, and a member connected to said guard and moved into the path of said cam when the guard is moved to its uncovering position, said guard being returned to its covering position when said cam engages and forces said member out of its path at the completion of a given cycle.

13. A cutting machine comprising a driving mechanism, a driven mechanism, a clutch for connecting the two together, means for operating the clutch and normally acting to disengage the clutch, a brake for stopping the driven member, means for operating said brake and normally acting to apply the same, said last mentioned means being entirely independent of said clutch operating means, a pipe line for conducting a fluid under pressure, two air cylinders connected in said pipe line in spaced relation, the piston of one air cylinder connected to the clutch operating means, the piston of the other cylinder connected to the brake operating means, and a plurality of manually operated valves in said pipe line requiring simultaneous actuation for starting the machine by admitting fluid under pressure to the pipe line to lift the pistons in the air cylinders to a position where they overcome and support the clutch and brake operating means and maintain the same supported so long as both valves are held open.

14. A cutting machine comprising a driving mechanism, a driven mechanism, a clutch for connecting the two together, means for operating the clutch and normally acting to disengage the clutch, a brake independent of the clutch for stopping the driven member, means for operating said brake and normally acting to apply the same, a pipe line for conducting a fluid under pressure, two air cylinders connected in said pipe line in spaced relation, the piston of one air cylinder connected to the clutch operating means, the piston of the other cylinder connected to the brake operating means, and a plurality of manually operated valves in said pipe line requiring simultaneous actuation for starting the machine by admitting fluid under pressure to the pipe line to lift the pistons in the air cylinders to a position where they overcome and support the clutch and brake operating means, and maintain the same supported so long as both valves are held open, and an automatically controlled valve independently actuated and which when actuated admits fluid under pressure to said air cylinders for the duration of one cycle of the cutting machine regardless of the position of the manually operated valves.

15. A cutting machine comprising a driving mechanism, a driven mechanism, a clutch for connecting the two together, means for operating the clutch and normally acting to disengage the clutch, a brake independent of the clutch and for stopping the driven member, means for operating said brake and normally acting to apply the same, a pipe line for conducting a fluid under pressure, two air cylinders connected in said pipe line in spaced relation, the piston of one air cylinder connected to the clutch operating means, the piston of the other cylinder connected to the brake operating means, and a plurality of manually operated valves in said pipe line requiring simultaneous actuation for starting the machine by admitting fluid under pressure to the pipe line to lift the pistons in the air cylinders to a position where they overcome and support the clutch and brake operating means and maintain the same supported so long as both valves are held open, means for insuring the release of the valves at the end of a given cycle of the driven mechanism, said means including a guard mounted on the machine to move between a covering position wherein the valves are rendered inaccessible and an uncovering position wherein the valves are accessible, and means connected to said guard and actuated by the driven mechanism for returning the guard to its covering position at the completion of a given cycle of the driven mechanism.

16. A cutting machine comprising a driving mechanism, a driven mechanism, a clutch for connecting the two together, a linkage for operating said clutch, gravity actuated means connected with said linkage and normally acting to disengage said clutch, a brake independent of the clutch for stopping the driven member, a linkage for operating said brake, gravity actuated means connected with said linkage and normally acting to apply the brake, a pipe line for conducting a fluid under pressure, two air cylinders connected in said pipe line in spaced relation, the piston of one air cylinder connected to the linkage for operating the clutch, the piston of the other cylinder connected to the linkage for operating the brake, and a plurality of manually operated valves in said pipe line requiring simultaneous actuation for starting the machine by admitting fluid under pressure to the pipe line to lift the pistons in the air cylinders to a position where they overcome and support the gravity actuated means normally acting to disengage the clutch and apply the brake.

17. In a cutting machine including a driving mechanism, a driven mechanism, the combination of a clutch for connecting the two mechanisms together, a brake for stopping the driven mechanism and independent of the clutch in its operation, a safety stop pin movable into and out of the path of the driven mechanism, and arranged to be moved into its safety position by the driven means at the completion of a given cycle thereof, remote dual manual controls for operating and coordinating the functions of the clutch, brake, and safety pin, said manual controls biased to a non-operating position so that release of one causes the clutch to be disengaged and the brake applied, and including means for removing the safety stop pin from the path of the driven mechanism prior to their actuation.

18. In a cutting machine including a driving means, a driven means, and a clutch for connecting the two together, the combination of a brake for stopping the driven means, a safety stop pin movably mounted on the machine to be moved into and out of the path of the driven mechanism, all of said means being independent of one another in their action, and remote dual manual controls requiring the use of both hands of an operator for causing the operating and coordinating of the functions of said independent means, said manual controls normally biased in non-operating positions so that removal of either hand of the operator from one control will result in disengaging the clutch, and applying the brake, independently of each other, to stop the machine at any position during the downward or cutting part of the cutting knife cycle, the safety stop pin being independently operated by the driven means to prevent repeat of the machine at completion of each full cycle of the machine.

19. In a cutting machine including a driving means, a driven means, and a clutch for connecting the two together, the combination of a brake for stopping the driven means and independent of the clutch in its action, remote dual manual controls requiring the use of both hands of the operator for causing the operating of the clutch and brake, the manual controls biased in non-operating position so that removal of either hand of the operator from one thereof will result in disengaging the clutch and applying the brake, independently of each other, and a safety stop pin movable into and out of the path of the driven means, and arranged relative the driven means and the manual controls so that before starting the machine the safety stop pin is removed from the path of the driven means, but is returned to its safety position by the driven means upon the completion of one cycle of the cutting machine.

20. In a cutting machine including a driving means, a driven means, a normally inoperative clutch for connecting the two together, a brake for stopping the driven means, said brake normally operative and independent of the clutch in its action, remote dual manual controls requiring the use of both hands of the operator for causing the operating and coordinating of the functions of the brake and clutch, and biased to a non-operating position so that release of either one will result in disengaging the clutch and applying the brake, a guard movably mounted on the machine for covering and uncovering the manual controls, a safety stop pin movable into and out of the path of the driven means, and so arranged between the guard and the driven means that when the guard is moved to uncover the manual controls the stop pin is removed from the path of the driven means, and when the driven means has completed one cycle the stop pin and guard are returned to their initial positions thereby.

HAYWOOD G. DEWEY.